United States Patent [19]

Munson

[11] Patent Number: 4,773,050

[45] Date of Patent: Sep. 20, 1988

[54] MINIATURE ROTARY TIMER

[76] Inventor: Robert Munson, 2531 B Lucy Lane, Walnut Creek, Calif. 94595

[21] Appl. No.: 106,422

[22] Filed: Oct. 9, 1987

[51] Int. Cl.[4] .......................... G04F 1/00; F16D 57/02

[52] U.S. Cl. ...................................... 368/97; 368/139; 188/296

[58] Field of Search ............... 188/290, 293, 296, 298; 368/89-92, 97-101, 65

[56] References Cited

U.S. PATENT DOCUMENTS

| | | | |
|---|---|---|---|
| 2,604,163 | 7/1952 | Exline | 188/276 |
| 3,651,903 | 3/1972 | Butler et al. | 188/290 |
| 3,712,421 | 1/1973 | Hadfield | 368/147 |

FOREIGN PATENT DOCUMENTS

| | | | |
|---|---|---|---|
| 2154769 | 5/1983 | Fed. Rep. of Germany | 368/91 |

*Primary Examiner*—Vit W. Miska
*Attorney, Agent, or Firm*—Bielen and Peterson

[57] ABSTRACT

A viscous fluid timer is constructed with a cylindrical cavity formed by a housing that supports an axially aligned rotor unit having a rotor on a shaft within a first chamber filled with a viscous fluid. The first chamber communicates with a second chamber having a shaft seal through which the rotor shaft projects, the rotor shaft having a torsional connection to a spring means for rotating the rotor unit within the chamber, the first chamber being filled with a highly viscous fluid which impedes the rotation of the rotor.

15 Claims, 2 Drawing Sheets

FIG-1
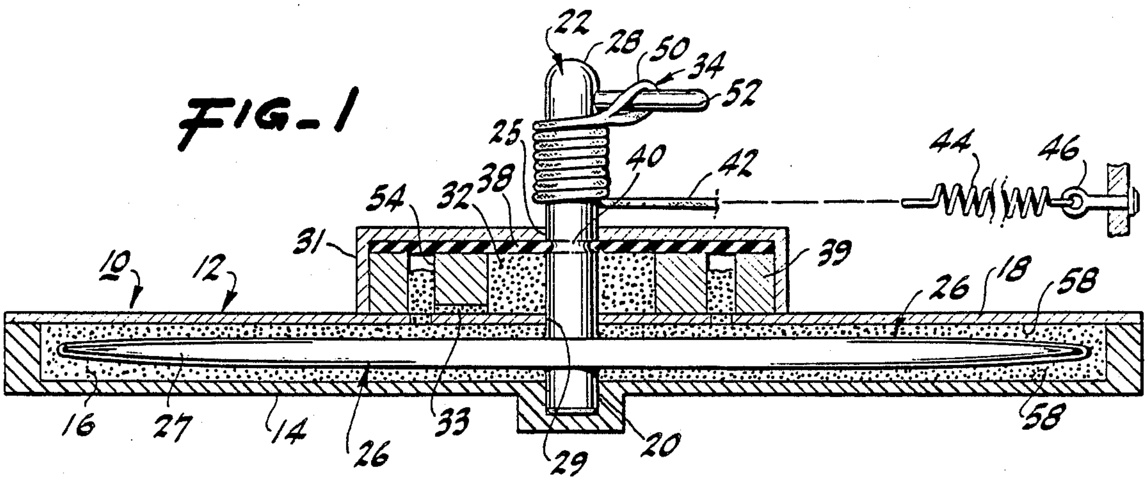
FIG-2
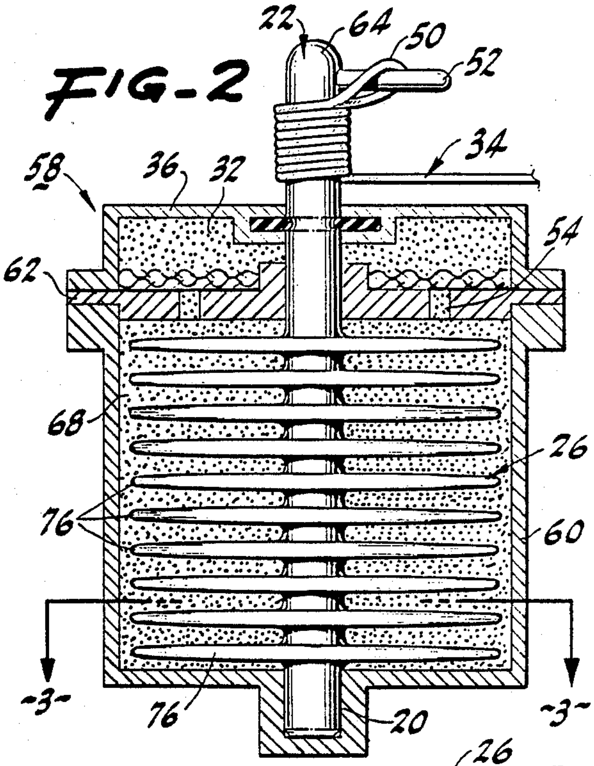
FIG-4
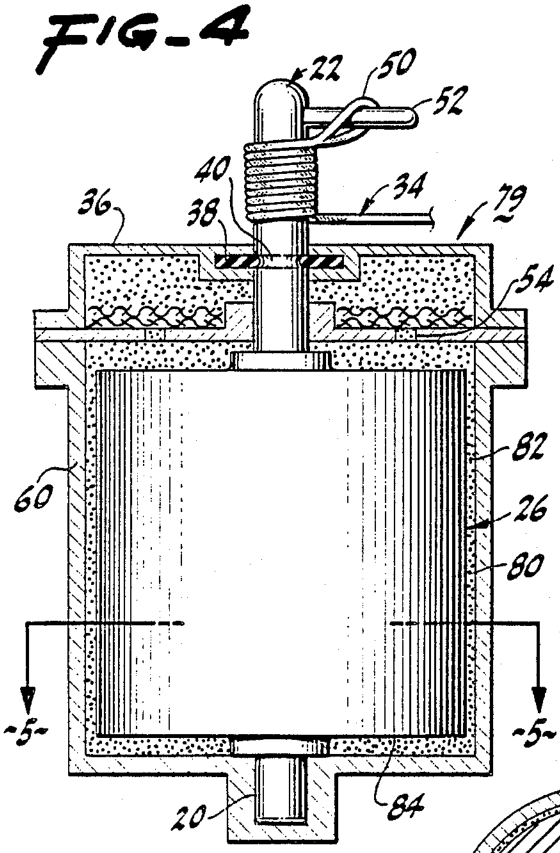
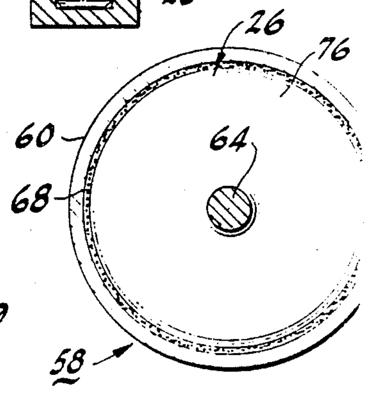
FIG-3
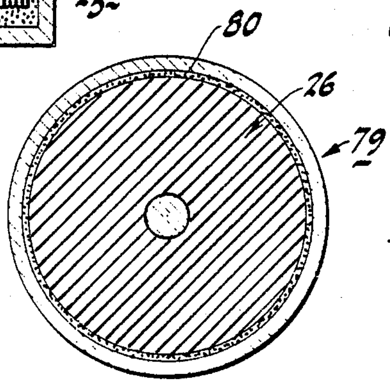
FIG-5

FIG-6A
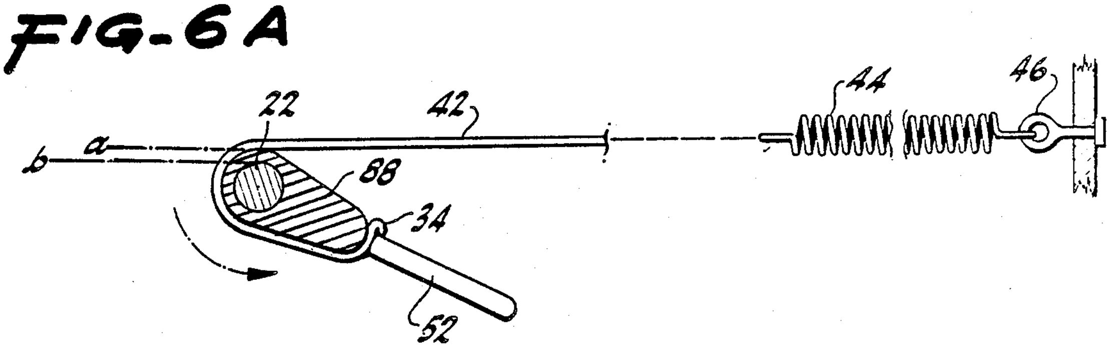
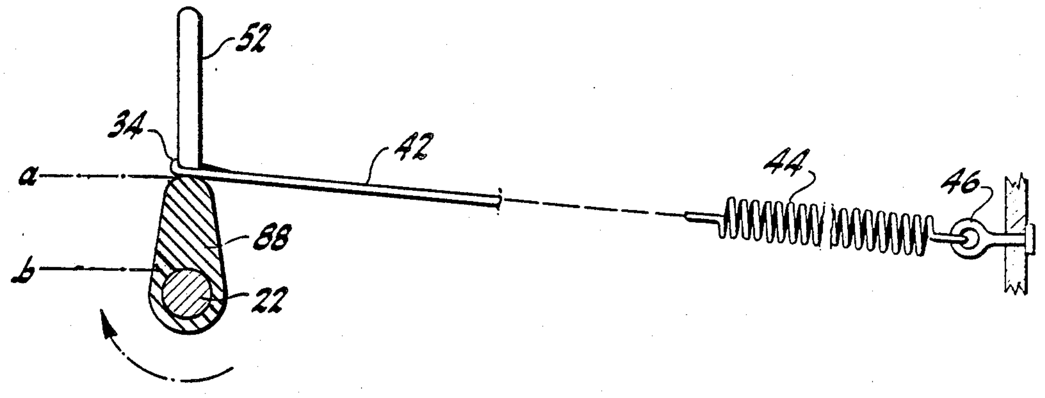
FIG-6B

MINIATURE ROTARY TIMER

BACKGROUND OF THE INVENTION

This invention relates to an improved, viscous-fluid, rotary timer. The rotary timer of this invention was developed for use in lightweight model aircraft. In the sport of hand-launched glider flying, model gliders are designed to stay aloft indefinitely where suitable currents provide the necessary lift. Because the flyer desires to terminate the flight at some reasonable time after initiation, means must be provided to return the aircraft to the ground for recovery. The timer is utilized to initiate a mechanical actuation, for example changing the attitude of the horizontal stabilizer thereby stalling the plane to the ground. Given a one or two ounce total glider weight, the combined weight of timer and actuator must be such that it does not significantly affect the quality of the glider's flight.

It has been found that a viscous-fluid rotary timer is well suited for such an application. Heretofore, as described in the patent of Hadfield U.S. Pat. No. 3,712,421, issued Jan. 23, 1973, entitled "Rotary Timer", a comparable timer has been suggested for use in missile or projectile fusing applications where its freedom from gravitational effects was considered advantageous. However, when the Hadfield device is run through the range of rotational speeds it will sustain in human hands, the viscous fluid medium is pumped past one or both journal seals thereby comprising its accuracy.

Improvements were made to the viscous-fluid rotary timer of the type described by Hadfield to:

a. Improve it's accuracy;

b. Extend it's ability to handle varying rotational inputs;

c. Better it's efficiency. This is to increase the amount of uniform retarding force generated by the rotor while decreasing the rotor mass.

SUMMARY OF THE INVENTION

The miniature viscous fluid timer of this invention is designated to generate the most uniform rotor retardation with the least rotor mass while maintaining it's accuracy through a broad range of rotor speeds for a minimum life of 10,000 rotations.

As previously mentioned, when the output shaft of a single chamber Hadfield type timer is turned at speeds above creep, pressure generated in the rotor chamber forces fluid out the shaft seals. Air enters the chamber at this time and is drawn into low pressure zones around the rotor. Previous to the entry of this air these low pressure zones contained an air free fluid mass that maintained the overall uniform retarding force generated within that chamber. When air enters the zones, a 'soft spot' is developed in the rotor's circuit that is 'felt' at the output shaft. The result is a loss of retarding force at that place in the rotor's circular path therefore a loss of total time metered by the rotor's movement. An interval time of 60 seconds before air entered the rotor chamber may read 50 seconds after.

Given rotational inputs 5-50 R.P.M., this process continues until the pumping effect of the rotor churning through a chewing gum like viscous mass is gradually neutralized by the steadily increasing volume of air.

One might conclude that this balance state would result in a satisfactory timer except for the following observations. This 'break in' period is a time consuming nuisance. Then, air in a highly viscous fluid medium, when subjected to varying rotational inputs changes it's shape and place in the rotor chamber in ways that cannot be predicted. The unpredictable changes in the retarding force exerted by this air-fluid medium directly and unfavorably affect the time metering function of the device. Additionally, the presence of any air in the fluid medium lessens the overall retarding force that might otherwise be generated. This loss of efficiency is problematic. The central problem faced designing and building a flexible (as regards it's ability to handle a range of rotor speeds without losing fluid), accurate and long lived viscous fluid timer is achieving and maintaining within the rotor chamber an air-free fluid mass.

Given the difficulties encountered in filling a chamber with an air-free fluid mass when the thickness of that fluid can be compared to chewing gum, it is surmised that though Hadfield thought he was completely filling his unit with silicon gum, it is unlikely. (Filling this dual chamber machine requires a vacuum chamber and 2-400 lbs of pumping pressure.) Given a single chamber and not quite air-free fluid mass, the paddle wheel shaped rotor Hadfield chose for his machine is probably the best. The reason for this being that paddle wheel shaped rotors achieve most of their retarding force by squeezing a fluid mass against the walls of the chamber. While this way of working fluid is relatively low in efficiency, the presence of small amounts of air in the rotor chamber is difficult to detect.

The possibility of using more robust seals in the Hadfield single chamber device was explored. It was found that the more robust the seal, the more pressure that seal exerts on the rotor shaft. That pressure, unlike the uniform retarding force exerted by the rotor in an air-free viscous medium, varies due to imperfections and inharmonies in the mating materials and minor misalignments regarding their places relative one to another. These imperfections have an increasing effect as the robustness of the seal increases. It is estimated that a surprising 80 p.s.i., perhaps more, can be achieved in the rotor chamber turning the output shaft by hand. The seal robust enough to retain fluid at these pressures introduces unpredictable variations in the otherwise uniform retarding force that spoil the timer's accuracy.

The solution to this sealing problem involves the use of ports drilled into a secondary chamber that provide temporary housing for fluid under pressure. This preferred configuration has a high pressure chamber housing a disc shaped rotor and receiving one end of the rotor shaft in a closed bearing well. The opposite end of the rotor shaft passes out of the primary chamber through a partition into a secondary chamber, then exits through a sealed journal bearing. Adjacent to the rotor shaft bearing surface in the partition between the primary and secondary chambers is positioned a circle of ports. These ports communicate directly with the primary chamber and extend through the walls of the secondary chamber. One or more of these ports connect via a drilled passageway, with the secondary chamber well. When the timer is evacuated and filled with fluid, an air space is left at the top of the fluid columns in these ports. These ports allow fluid to shuttle between chambers relative to the amount of pressure generated in the primary chamber at varying rotor speeds. Relatively high rotor speeds temporarily and partially evacuate the fluid mass surrounding the rotor by pumping small amounts of fluid up into the secondary chamber with one or more of the relief ports is to permit fluid pumped past the shaft bearing in the partition to return to the primary chamber, thereby avoiding critical loads on the rotor shaft seal. By closing the timer at the bottom and using ports to temporarily hold fluid when the timer is subjected to higher rotor speeds, we have reduced the number of seals by 50% and reduced the demands on the remaining seal to a level that does not compromise it's integrity.

The disc shaped rotor as an additional improvement to the Hadfield device was made because stickiness happens in the absence of air. In the same way that two pieces of glass laid one on the other will squeeze out the air and stick together or a drop of water will stick to a surface, a highly viscous fluid will adhere to the surface of a rotor if one can just keep the air out from between. An air-free chamber and fluid mass, are prerequisites to the efficient operation of a viscous fluid rotary timer. As such, they provide the impetus for development of a process that insured an air-free fluid mass in an air-free rotor chamber. The paddle-wheel-type rotor of Hadfield generates retarding force at it's top and blade tips where fluid roll is sheared against the chamber walls. The rolling and squeezing action of the paddle wheel configuration is less sensitive to the presence of air than the high-efficiency high-surface area rotors that develop retardant force over their entire surfaces on the stickiness or absence of air principle.

Given then a thin disc, surrounded by an air free fluid mass, wrapped in a close fitting, flat cylinder, roughly 70% of the chamber volume can be used to generate uniform retarding force. When the paddle wheel configuration is used, roughly 10% of its chamber volume is used to generate work. Removal of air dramatically improves efficiency.

In summary, single chamber viscous timer such as the Hadfield device leaks fluid thereby loosing accuracy when subjected to varying rotational inputs.

The dual chamber, disc rotor machine of this invention handles varying rotational inputs by permitting the temporary venting of fluid under pressure into ports drilled into the secondary chamber. It does not leak or loose accuracy. Whereas the paddle wheel rotor generates retarding force or work in roughly 10% of the rotor chamber, the disc rotor does more work in less space with less materials.

The various features described combine to form a substantially improved device, various embodiments of which are described in further detail in the detail description of the preferred embodiments.

BRIEF DESCRIPTION OF THE DRAWINGS

FIG. 1 is a cross sectional view of a first embodiment of the rotary timer.

FIG. 2 is a cross sectional view of a second embodiment of the rotary timer.

FIG. 3 is a cross sectional view taken along the lines 2—2 in FIG. 2.

FIG. 4 is a cross sectional view of a third embodiment of the rotary timer.

FIG. 5 is a cross sectional view taken along the lines 4—4 in FIG. 4.

FIG. *6a* is a top view of a biasing means.

FIG. *6b* is a top view of a biasing means in alternate position.

DETAILED DESCRIPTION OF THE PREFERRED EMBODIMENTS

The preferred embodiment of the viscous-fluid, rotary timer of this invention is shown in FIG. 1 and designated generally by the reference numeral 11. The timer includes an outer housing 12 with a shallow circular receptacle 14 forming a primary or high pressure fluid chamber 16 when capped by a partition plate 18. The receptacle 14 has a central well or journal box 20 for rotatably engaging the shaft or spindle 22 of rotor 26. The rotor 26 here in the configuration of a flat circular disc 27 is centrally positioned in the rotor chamber 16. The spindle 22 has a projecting portion 28 that passes through a bearing surface 29 in the plate 18 and extends through the secondary or low pressure chamber 32 and the bearing surface 25 where it is engaged by a biasing means 34. The secondary chamber 32 is formed by a circular housing 39 which contains relief ports 54. Assembled over the housing 39 helping to position and contain the deformable flat seal 38 and the rotor shaft 22, is the secondary chamber cap 32. The seal 38 engages a groove 40 in the shaft.

The biasing means 34 may comprise any type of device that can apply a uniform torsional force to the rotor shaft. A simple biasing means may compromise a wrapped string 42 that is connected to a coil spring 44 anchored at one end by an eye pin 46. For model plane application it is sufficient to use elastic thread as a biasing means. While ordinarily the device is constructed to utilize a single wrap of string around the shaft, more than one wrap may be used as shown in the embodiments of the drawings, to incremetally increase the time metered by the device.

The end of the string 42 has a loop 50 which loops over a peg 52 radially projecting from the shaft 22 such that the string is released once the string has unwound from the shaft. This release provides the mechanical activation desired. For example in model plane usage the airplanes horizontal stabilizer may be held in correct position by the biasing means 34 and upon release of the string 42 a weaker countervailing bias may cause the stabilizer to raise stalling the model and bringing it to earth.

The means for providing retardation to rotation of the rotorshaft is the interaction of a heavy fluid, commonly referred to as a silicon gum, with a revolving rotor or spool. The preferred fluid has the chemical name dimethylpolysiloxane and is produced by General Electric. The plate 18 partitioning the primary and secondary chambers has a series of ports 54 into which fluid under pressure resulting rotor activity in from the primary chamber, is temporarily held thereby avoiding critical loads on journal seals as was the case with prior art single chamber devices. External atmospheric pressure and the partial vacuum created in the high pressure chamber when the rotor's movement slows or ceases. Under normal use the recovery time between uses is such that these minor and short term losses of fluid in the primary chamber and therefore retarding force, escape notice. In the embodiments of FIGS. 2 and 4 the ports are short relative to the long ports used in the preferred embodiment of FIG. 1. In FIGS. 2 and 4 the ports have been covered by a fine mesh material such as felt to preclude the possibility of air, trapped in the capping process, migrating to and through those ports into the primary chamber.

As shown in FIGS. 2 and 4, timers can be constructed using variations in the design of the rotor or spool 26 and the high pressure or primary chamber 16 while incorporating similar cooperating components as shown in FIG. 1. For example, in the unit 58 of FIG. 2 a deeper cylindrical receptacle 60 is shown covered by a partition plate 62 and capped by a cap 36 that is similarly constructed to the cap shown in FIG. 1 forming the secondary chamber 32. An elongated spindle 64 is similarly engaged at one end in a journal box 20 integrally formed in the receptacle 60. Spindle 64 protrudes from through the cap 36 for connection to a biasing means 34 shown in part. The primary chamber 68 formed by the receptacle 60 and plate 62 again contains a highly viscous fluid medium such as silicon gum. Fixed to the spindle or shaft 64 is a spool 26 comprising a stacked series of displaced plates 76 which rotate together with the shaft upon application to the rotary biasing means 34.

Since it is believed that it is the shearing action of a maximally air-free, therefore sticky, fluid mass against a maximally air-free solid surface that generates uniform retarding force, it follows that if there is an increase in the surface against which an air-free fluid mass is 'worked' there will be a corresponding increase in the amount of uniform retarding force or resistance generated. This turns out to be, in practice, true. Therefore, if we increase the number, or better still, the diamater of the disc or discs in the high pressure rotor chamber we will increase the amount of retarding force generated, enabling us to meter greater increments of time per rotor revolution.

The single disc device of FIG. 1 is the preferred embodiment because this configuration enables miniature timer to be constructed with a primary chamber width of less than one eight of an inch. The narrow profile of this configuration is ideal for timers fitted to bore holes in the narrow body of a hand-launched glider.

The timer unit 79 of FIGS. 4 and 5 has a similar construction to that of FIG. 2, the only modification being in the structure of the rotor 26. In FIG. 4 the rotor is in the shape of a cylindrical drum 80 instead of a disc 27 of FIG. 1 or stack of discs 76 of FIG. 2. Each of the configurations picture has means by which fluid under pressure is temporarily held in relief ports 54, thereby avoiding critical loads on the journal seal 38. Each of the configurations pictured has rotor designs that offer greater surface areas for 'working' fluid thereby generating more uniform retarding force than was possible with the prior art design. The improved seal designs and dual chamber sealing technology are, however applicable to prior art paddle wheel configurations.

Referring to the schematic drawings of FIGS. *6a* and *6b*, a system for developing a constant torque on the shaft for spring-type bias means is shown. The shaft is provided with an effective cross-sectional configuration that is cam-like to compensate for the diminishing force generated by a spring or elastic bias means as it contracts. In the figures shown, the radially projecting peg 52 has a cam configured hub 88 set over the shaft 22. The line 42 has a single wrap around the hub 88. As shown in FIG. *6a*, the lever arm a–b at the beginning of unwind is substantially smaller than the lever arm 1–b in FIG. *6b* near the end of unwind. By appropriate selection of cam configuration and spring constant of the spring or elastic used, a constant torque, can be provided to the shaft by the bias means as the spring or elastic contracts or relaxes.

While in the foregoing embodiments of the present invention have been set forth in considerable detail for making a complete disclosure of the invention, it may be apparent to those of skill in the art that numerous equivalent chambers and rotors may be made without departing from the spirit and principles of the invention.

What is claimed is:

1. An improved, viscous-fluid rotary timer having a housing forming a fluid chamber, the chamber being filled with a viscous fluid, a rotor, rotatably mounted in the housing in contact with the fluid, and a shaft fixed to the rotor having first and second ends, the first end having a portion external to the housing and being connected to a rotational bias means for rotation of the rotor in the viscous fluid in the chamber wherein the improvement comprises:
   a partition in the housing dividing the chamber into a primary chamber and a secondary chamber wherein the rotor is located in the primary chamber, the partition having ports communicating between the primary chamber and secondary chamber, the shaft passing through the secondary chamber with the end portion extending external to the secondary chamber for engagement with the rotational bias means.

2. The rotary timer of claim 1 wherein the ports are covered by a fluid pervious mesh positioned over the ports in the secondary chamber.

3. The rotary timer of claim 1 wherein the rotor has the configuration of a flat disk.

4. The rotary timer of claim 1 wherein the rotor has the configurations of a stack of spaced flat discs.

5. The rotary timer of claim 1 wherein the rotor has the configuration of a drum.

6. The rotary timer of claim 1 having further, a sealing measn having a journal well in the housing engaging the second end of the shaft and a deformable seal mounted in the housing, the shaft having a circumferential groove proximate the first end, the seal being seated in the groove with the end portion of the shaft extending from the housing for engagement with the bias means.

7. An improved viscous-fluid rotary timer having a housing forming a primary, high pressure chamber, the chamber being filled with a viscous fluid, the timer having further a rotor contained in the primary chamber and a shaft fixed to the rotor, the shaft engaging a journal seal in the housing and having rotary bias means for applying a torsional force to rotate the rotor, the improvement comprising a secondary, low pressure chamber that functions to diminish critical high pressure viscous fluid loads on the journal seal by providing temporary holding zones for receiving fluid as it exits the primary chamber during rotor action.

8. The rotary timer of claim 7 wherein secondary chamber is separated from the primary by a partition with ports for the communication of fluid under pressure from the high pressure of primary chamber into the temporary holding zones.

9. The rotary timer of claim 7 wherein the ports are covered by a fluid pervious mesh positioned over the ports in the secondary chamber.

10. The rotary timer of claim 7 wherein the rotor has the configuration of a flat disc.

11. The rotary timer of claim 7 wherein the rotor has the configuration of a stack of spaced flat discs.

12. The configuration of claim 7 wherein the rotor has the configuration of a drum.

13. The rotary timer of claim 7 having rotor chamber sealing means comprising a seal mounted in the housing and a groove in the shaft, the seal seating in the groove in the shaft.

14. The rotary timer of claim 7 wherein the bias means is comprised of a peg radially projecting from rotor shaft and a pre biased line having an end with a line loop, wherein the loop can be placed over the radially projecting peg and wound upon the rotor shaft, the prebiased line applying torque to the rotor shaft throughout a metered unwinding process whereupon the line loop slips off of the radially projecting peg providing a desired metered mechanical activation.

15. The rotary timer of claim 14 wherein the line is wound a single rotation around the shaft and the shaft has a cross section cam configuration constructed to effect a constant torque by compensating for a diminishing bias in spring and elastic type bias means.

* * * * *